(12) United States Patent
Inagaki et al.

(10) Patent No.: US 11,733,044 B2
(45) Date of Patent: Aug. 22, 2023

(54) INERTIAL SENSOR AND METHOD FOR MANUFACTURING THE SAME

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Yuuki Inagaki, Nisshin (JP); Yusuke Kawai, Nisshin (JP); Takahiko Yoshida, Nisshin (JP); Shota Harada, Nisshin (JP); Katsuaki Goto, Nisshin (JP); Keitaro Ito, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 17/730,284

(22) Filed: Apr. 27, 2022

(65) Prior Publication Data
US 2022/0373332 A1 Nov. 24, 2022

(30) Foreign Application Priority Data
May 21, 2021 (JP) ................. 2021-086425

(51) Int. Cl.
*G01C 19/5712* (2012.01)
(52) U.S. Cl.
CPC ............... *G01C 19/5712* (2013.01)

(58) Field of Classification Search
CPC .... G01C 19/5712; G01C 19/5691; G01P 1/00
See application file for complete search history.

(56) References Cited

U.S. PATENT DOCUMENTS

| | | | |
|---|---|---|---|
| 8,327,526 B2* | 12/2012 | Ge | G01C 25/00 73/497 |
| 9,599,470 B1* | 3/2017 | Kirby | G01C 19/5691 |
| 2009/0031832 A1* | 2/2009 | Choi | G01C 19/5691 74/5.6 D |
| 2013/0160578 A1* | 6/2013 | Najafi | G01C 19/5691 74/5.6 D |

(Continued)

FOREIGN PATENT DOCUMENTS

CN 110749315 A 2/2020

*Primary Examiner* — David J Bolduc
(74) *Attorney, Agent, or Firm* — Posz Law Group, PLC

(57) ABSTRACT

An inertial sensor includes a lower substrate and an upper substrate. The upper substrate includes a micro oscillator, electrodes and a pad, which are independent of each other. The micro oscillator includes a curved surface portion, a joint portion recessed inward from an apex of the curved surface portion and joined to a support portion of the lower substrate, a rim at an end of the curved surface portion and a conductive film covering the micro oscillator. The curved surface portion is in an aerial state. The rim is made of the same material as the electrodes, located on a virtual flat plane formed by the electrodes, and apart from and surrounded by the electrodes. A portion of the conductive film that covers the joint portion is electrically bonded to a lower metal film covering the support portion.

8 Claims, 11 Drawing Sheets

(56) References Cited

U.S. PATENT DOCUMENTS

| | | | |
|---|---|---|---|
| 2016/0047653 A1* | 2/2016 | Shkel | G01C 19/5691 |
| | | | 73/504.13 |
| 2016/0164458 A1* | 6/2016 | Nguyen | H01P 1/39 |
| | | | 331/154 |
| 2016/0231113 A1* | 8/2016 | Rozelle | G01C 19/5691 |
| 2016/0344368 A1* | 11/2016 | Ayazi | G01C 19/5712 |
| 2017/0248422 A1* | 8/2017 | Najafi | G01D 5/34 |
| 2018/0188030 A1* | 7/2018 | Shang | B81C 1/00269 |
| 2019/0094024 A1 | 3/2019 | Najafi et al. | |
| 2020/0309527 A1* | 10/2020 | Shkel | B81C 1/00182 |
| 2021/0180951 A1* | 6/2021 | Cho | G01C 25/00 |
| 2022/0090917 A1* | 3/2022 | Najafi | G01C 19/5684 |
| 2022/0187072 A1* | 6/2022 | Akashi | B81C 1/00634 |
| 2022/0315411 A1* | 10/2022 | Ito | G01C 19/5691 |
| 2022/0316880 A1* | 10/2022 | Harada | G01C 19/56 |

* cited by examiner is a cross-sectional view taken along a line V-V in FIG. 2.

INERTIAL SENSOR AND METHOD FOR MANUFACTURING THE SAME

CROSS REFERENCE TO RELATED APPLICATION

The present application claims the benefit of priority from Japanese Patent Application No. 2021-086425 filed on May 21, 2021. The entire disclosure of the above application is incorporated herein by reference.

TECHNICAL FIELD

The present disclosure relates to an inertial sensor, and a method for manufacturing the inertial sensor.

BACKGROUND

A Bird-bath Resonator Gyroscope is regarded as one of gyro sensors to realize a highly sensitive Inertial Measurement Unit used for a self-position estimation system in level 3 self-driving.

SUMMARY

According to an embodiment of the present disclosure, an inertial sensor includes a lower substrate and an upper substrate. The lower substrate includes a support portion, an etching groove surrounding the support portion, a wire extending across the etching groove, and a lower metal film covering the support portion. The upper substrate includes a micro oscillator, electrodes, and a pad, which are independent of each other. The micro oscillator includes a curved surface portion, a joint portion, a rim and a conductive film. The curved surface portion has a three-dimensional curved surface. The joint portion is recessed inward from an apex of the curved surface portion and joined to the support portion of the lower substrate. The rim is formed at an end of the curved surface portion opposite to the joint portion. The conductive film covers an outer surface and an inner surface of the micro oscillator. The curved surface portion is in an aerial state in which the curved surface portion is not in contact with other members. The rim is made of the same material as the electrodes. The rim is located on a virtual flat plane formed by the electrodes. The rim is apart from and surrounded by the electrodes. A portion of the conductive film that covers the joint portion is electrically bonded to the lower metal film.

BRIEF DESCRIPTION OF DRAWING

The details of one or more embodiments are set forth in the accompanying drawings and the description below. Other features and advantages will be apparent from the description and drawings, and from the claims.

DETAILED DESCRIPTION

Figure 1:
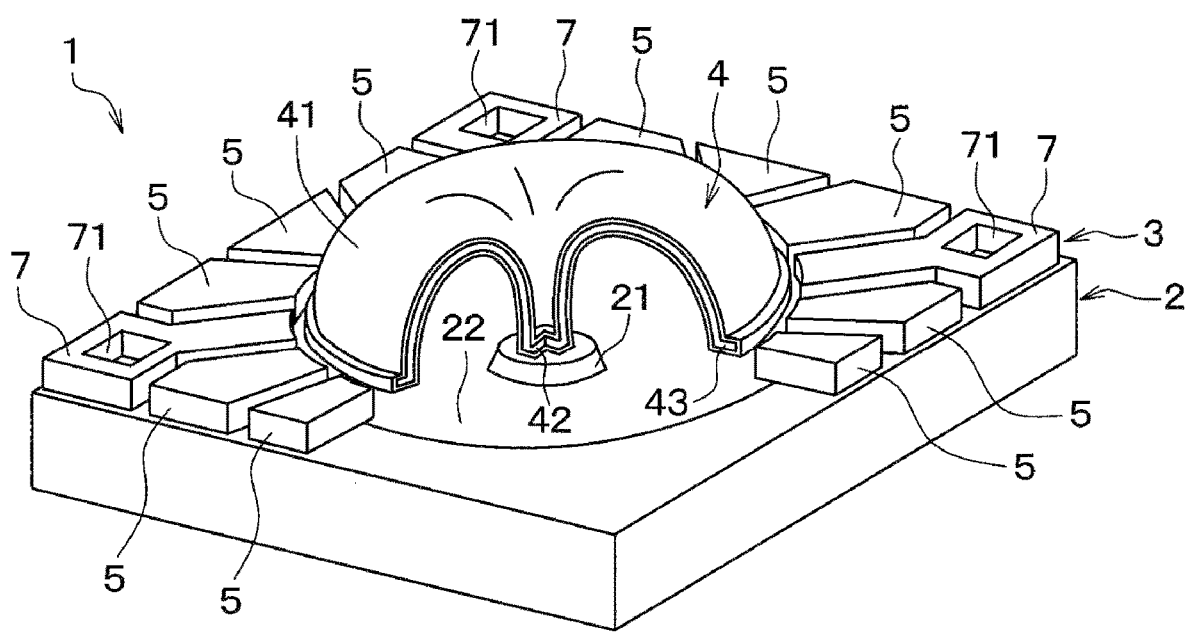
FIG. 1 is a perspective cross-sectional view showing an inertial sensor according to a first embodiment.

In recent years, a system for self-driving of a vehicle has been developed. This type of system requires a highly accurate self-position estimation technology. For example, a self-position estimation system equipped with a GNSS (i.e. Global Navigation Satellite System) and an IMU (i.e. Inertial Measurement Unit) has been developed for so-called level 3 self-driving. The IMU is, for example, a 6-axis inertial sensor composed of a 3-axis gyro sensor and a 3-axis acceleration sensor. In the future, in order to realize level 4 or higher self-driving, an IMU with higher sensitivity than the current one may be required.

A BRG (i.e. Bird-bath Resonator Gyroscope) is regarded as one of promising gyro sensors to realize such a highly sensitive IMU. The BRG includes a micro oscillator mounted on a substrate and having a three-dimensional curved surface that vibrates in a wine-glass mode. This micro oscillator has a Q factor that represents a vibration state and reaches $10^6$ or more. Therefore, it is expected that this micro oscillator produces a high sensitivity.

However, since the BRG is obtained by joining the micro oscillator to the substrate having multiple electrodes, if positional shift therebetween occurs at the time of mounting, a variation in distance between the micro oscillator and the multiple electrodes may cause a difference in static capacitance and may reduce sensor accuracy. A BRG of a comparative example is capable of suppressing such variation in the distance between the micro oscillator and the multiple electrodes.

The BRG of the comparative example includes a lower substrate made of silicon or the like, and an upper substrate made of borosilicate glass or the like. The upper substrate and the lower substrate are joined, and the upper substrate includes multiple electrodes and a micro oscillator which are isolated from each other. Further, this BRG is obtained as follows. A flat plate material that is to become the upper substrate is anodically bonded to the lower substrate having an annular groove. Then, the flat plate material is heated at a high temperature under reduced pressure to form the micro oscillator, and then the micro oscillator and the multiple electrodes are separated from each other by etching. As a result, the positional shift between the micro oscillator and the multiple electrodes does not occur, and the difference in static capacitance caused by the positional shift can be reduced in the BRG.

However, in the BRG of the comparative example, since the micro oscillator is formed after the flat plate material is bonded to the lower substrate, a conductive film cannot be formed on an inner surface of the micro oscillator facing the lower substrate, and thereby it is difficult to electrically connect the micro oscillator and the lower substrate. Therefore, this BRG has a structure in which a predetermined voltage cannot applied to the micro oscillator by an external power source, and the micro oscillator cannot be fixed at a predetermined potential.

In contrast, according to an aspect of the present disclosure, an inertial sensor includes a lower substrate and an upper substrate. The lower substrate includes a support portion, an etching groove surrounding the support portion, a wire extending across the etching groove, and a lower metal film covering the support portion. The upper substrate includes a micro oscillator, electrodes, and a pad, which are independent of each other. The micro oscillator includes a curved surface portion, a joint portion, a rim and a conductive film. The curved surface portion has a three-dimensional curved surface. The joint portion is recessed inward from an apex of the curved surface portion and joined to the support portion of the lower substrate. The rim is formed at an end of the curved surface portion opposite to the joint portion. The conductive film covers an outer surface and an inner surface of the micro oscillator. The curved surface portion is in an aerial state in which the curved surface portion is not in contact with other members. The rim is made of the same material as the electrodes. The rim is located on a virtual flat plane formed by the electrodes. The rim is apart from and surrounded by the electrodes. A portion of the conductive film that covers the joint portion is electrically bonded to the lower metal film.

Accordingly, the inertial sensor includes the upper substrate and the lower substrate. The upper substrate includes the micro oscillator, the electrodes, and the pad. The lower substrate includes the support portion, the etching groove, the wire and the lower metal film. The upper substrate and the lower substrate are joined to each other, and the micro oscillator is electrically connected to the lower substrate. In this inertial sensor, the conductive film formed on the inner surface of the micro oscillator is connected to the lower metal film of the lower substrate. Therefore, it is possible to fix the potential of the micro oscillator and apply a predetermined voltage to the micro oscillator through the lower substrate. The rim of the micro oscillator and the electrodes are made of the same material and are coplanar to each other. There is no variation in distance between the micro oscillator and the electrodes. Therefore, the inertial sensor has a structure in which the potential of the micro oscillator can be fixed and voltage can be applied to the micro oscillator, and the difference in capacitance due to the variation in distance between the micro oscillator and the electrodes is suppressed.

Further, according to another aspect of the present disclosure, a method for manufacturing an inertial sensor is proposed. In the manufacturing method, a lower substrate is prepared, and the lower substrate includes a support portion, an etching groove surrounding the support portion, a wire extending across the etching groove, and a lower metal film covering the support portion. A plate material having a plate shape is prepared. A curved surface portion having an annular shape is formed in the plate material. After the forming of the curved surface portion, an upper metal film is formed on a surface of the plate material that is opposite to a protruding surface of the plate material on which the curved surface portion protrudes. The upper metal film and the lower metal film are bonded to integrate the plate material and the lower substrate. A through groove having an annular shape surrounding the curved surface portion is formed on the plate material bonded to the lower substrate such that the curved surface portion is apart from the other portion of the plate material. After forming the through groove, a conductive film is formed on the protruding surface of the plate material. After forming of the conductive film, a through groove is formed in an outer peripheral portion located radially outward of the curved surface portion of the plate material such that electrodes and a pad electrically independent of each other are formed.

Accordingly, the micro oscillator and the electrodes are formed of one plate material. The plate material is bonded to the lower substrate and then separated. Therefore, there is no variation in distance between the micro oscillator and the electrodes. Further, the upper metal film is formed on a surface of the plate material that is to be joined to the lower substrate later. After the lower substrate and the plate material are joined, the plate material is separated into the micro oscillator, the electrodes, and the pad. Therefore, the inertial sensor having a structure in which the micro oscillator and the lower substrate are electrically connected can be manufactured. Therefore, it is possible to fix the potential of the micro oscillator and apply a voltage to the micro oscillator. Further, there is no difference in capacitance due to the variation in distance between the micro oscillator and the electrodes, and thereby a high-accuracy physical quantity sensor can be manufactured.

Hereinafter, embodiments of the present disclosure will be described with reference to the drawings. In the following embodiments, the same reference numerals are assigned to parts that are the same or equivalent to each other to describe the same.

First Embodiment

An inertial sensor 1 according to a first embodiment will be described with reference to FIGS. 1 to 5.

In FIG. 1, in order to make a configuration of the inertial sensor 1 easy to understand, a lower substrate 2, an upper substrate 3 and a micro oscillator 4 of the inertial sensor 1 described later are partially omitted, and a cross-section of the micro oscillator 4 is partially shown.

Figure 2:
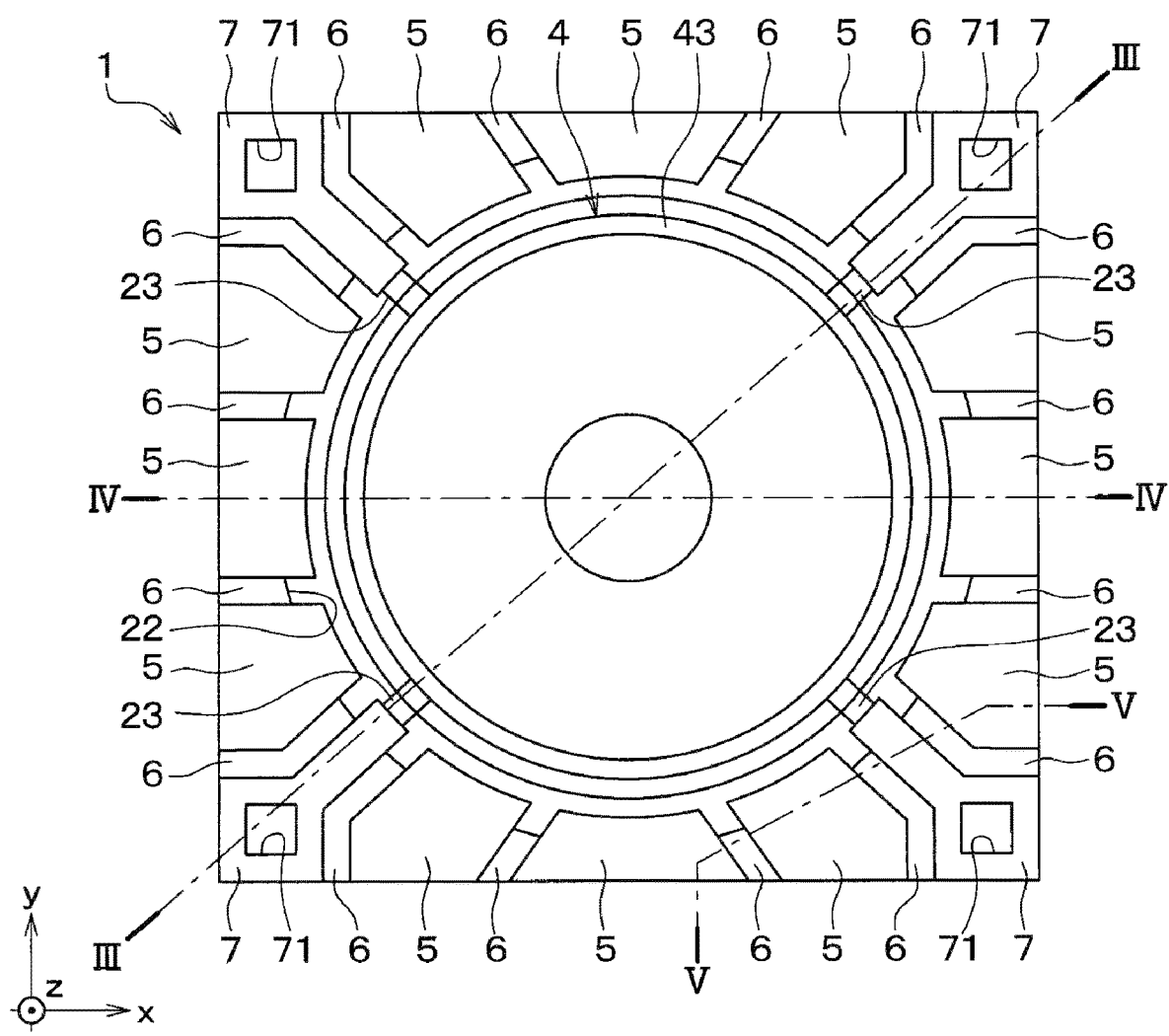
FIG. 2 is a top view showing the inertial sensor according to the first embodiment.

Hereinafter, for convenience of explanation, as shown in FIG. 2, the direction along the right-left direction in the view is referred to as a "x direction", the direction orthogonal to the x direction in the view is referred to as a "y direction", and the normal direction to the x-y plane is referred to as a "z direction". The x, y, and z directions in the views of FIG. 3 and subsequent drawings correspond to the x, y, and z directions in FIG. 1, respectively. Further, in the present specification, "upper" represents a direction along the z direction in the drawings and represents an arrow direction, and "lower" represents an opposite direction that is opposite to the upper. Further, in the present specification, for example, as shown in FIG. 2, a state in which the inertial sensor 1 is viewed from the upper side in the z direction may be referred to as a "top view".

The inertial sensor 1 of the present embodiment includes the lower substrate 2 and the upper substrate 3 which are joined to each other, as shown in FIG. 1, for example. The upper substrate 3 includes the micro oscillator 4, electrodes 5, and pads 7. In the inertial sensor 1, the micro oscillator 4 includes a curved surface portion 41 having a bowl-shaped three-dimensional curved surface, and a concave portion recessed inward from the apex of the curved surface portion 41. The recess portion is a joint portion 42 joined to the lower substrate 2. In the inertial sensor 1, the curved surface portion 41 is in an aerial state in which the curved surface portion 41 is not in contact with other members. An end of the curved surface portion 41 opposite to the joint portion 42 has a rim 43. The rim 43 is surrounded by and apart from the electrodes 5 which are independent from each other. In the inertial sensor 1, the rim 43 and the electrodes 5 form a capacitor. On the basis of a change in electrostatic capacitance of the capacitor, a predetermined physical quantity such as an angular velocity applied to the inertial sensor 1 can be detected. The inertial sensor 1 is, for example, a gyro sensor having a BRG structure, and may be suitable for applications to be mounted on vehicles such as automobiles, nevertheless, the sensor may also be applied to other applications.

The lower substrate 2 is mainly made of, for example, Si (silicon), which is a semiconductor material. The lower substrate 2 includes a support portion 21 joined to the micro oscillator 4 of the upper substrate 3, an etching groove 22 having an annular shape surrounding the support portion 21, wires 23, and a lower metal film 24. In the lower substrate 2, for example, the wires 23 and the lower metal film 24 are obtained by a vacuum film formation method such as sputtering after the annular etching groove 22 is formed on a Si substrate by wet etching using an alkaline aqueous solution such as KOH or TMAH. In the lower substrate 2, as shown in FIG. 2, for example, a region located outside the etching groove 22 in the top view is defined as an outer peripheral region, and the multiple wires 23 connect the support portion 21 and the outer peripheral region across the etching groove 22.

The wires 23 and the lower metal film 24 are, for example, a laminated film in which Ti (titanium) and Au (gold) are laminated in this order on the substrate. The wires 23 and the lower metal film 24 are formed to have a predetermined pattern shape via a photolithography etching method or the like after vacuum film formation. The lower metal film 24 covers a region other than the bottom of the etching groove 22, that is, a part of the outer peripheral region and the support portion 21. The wires 23 have a pattern shape extending across an outer edge and an inner edge of the etching groove 22. The wires 23 electrically connect a portion of the lower metal film 24 covering the support portion 21 and a portion of the lower metal film 24 covering the outer peripheral region. The lower metal film 24 is metal-bonded to an upper metal film 31 of the upper substrate 3. The lower metal film 24 is substantially integrated with the upper metal film 31.

The wires 23 and the lower metal film 24 may be formed in separate processes. In this case, the wires 23 may be made of a conductive metal material, such as Al (aluminum), different from that of the lower metal film 24.

The upper substrate 3 is made of, for example, glass, which contains additives such as quartz and borosilicate glass, metallic glass, and/or a material such as silicon and ceramics. The upper substrate 3 includes the micro oscillator 4 that can vibrate in a wine-glass mode, the electrodes 5, and the pads 7, which are independent from each other by separation grooves 6. The upper substrate 3 is obtained as follows. A flat plate material made of the above-mentioned material is processed to form the micro oscillator 4, and then the micro oscillator 4 is joined to the lower substrate 2. Subsequently, the micro oscillator 4, the electrodes 5, and the pads 7 are separated by etching. In other words, the micro oscillator 4, the electrodes 5, and the pads 7 of the upper substrate 3 are made of the same material. The details of this structure is described hereinafter.

The micro oscillator 4 includes the curved surface portion 41, the joint portion 42 and the rim 43. The curved surface portion 41 has an outer shape of a substantially hemispherical three-dimensional curved surface. The joint portion 42 is recessed from the apex of the curved surface portion 41 having an annular curved surface shape toward the center of the hemisphere, and is joined to the lower substrate 2. As shown in FIG. 2, for example, in the micro oscillator 4, the rim 43 has a substantially cylindrical shape so that distances between the rim 43 and the electrodes 5 are equal when the inertial sensor 1 is not driven. Since the curved surface portion 41 has a bowl-shaped three-dimensional curved surface, a Q factor of vibration of the micro oscillator 4 is $10^6$ or more, for example. The micro oscillator 4 has a thin wall of several tens of μm, for example, having a thickness of 20 μm to 80 μm. The micro oscillator 4 is millimeter-sized such that a dimension in the z direction (i.e. height direction) is 2.5 mm and a maximum diameter in an in-plane direction (i.e. xy plane) is 5 mm.

Figure 3:
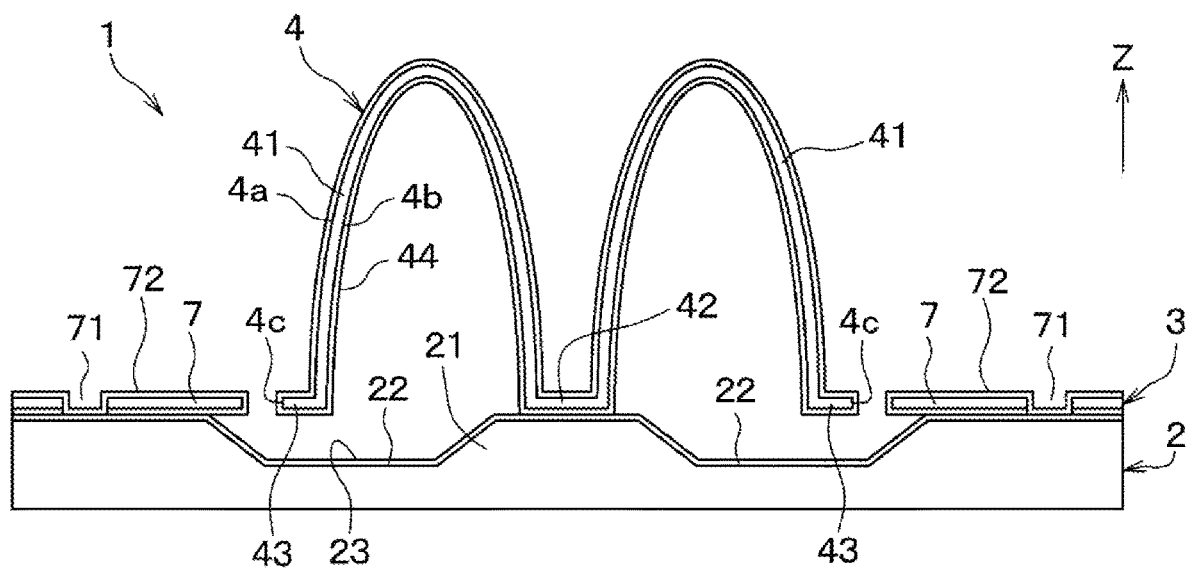
FIG. 3 is a cross-sectional view taken along a line III-III in FIG. 2.

As shown in FIG. 3, for example, the micro oscillator 4 has an outer surface 4a (i.e. front surface) that is large in outer diameter, and an inner surface 4b (i.e. back surface) that is small in outer diameter. The outer surface 4a is larger in outer diameter than the inner surface 4b. Both the outer surface 4a and the inner surface 4b are covered by a conductive film 44, and thereby these surfaces are electrically connected to each other. That is, in the micro oscillator 4, not only the outer surface 4a but also the inner surface 4b facing the lower substrate 2 and a lateral surface 4c of the rim 43 connecting the outer surface 4a and the inner surface 4b are covered by the conductive film 44.

Figure 4:
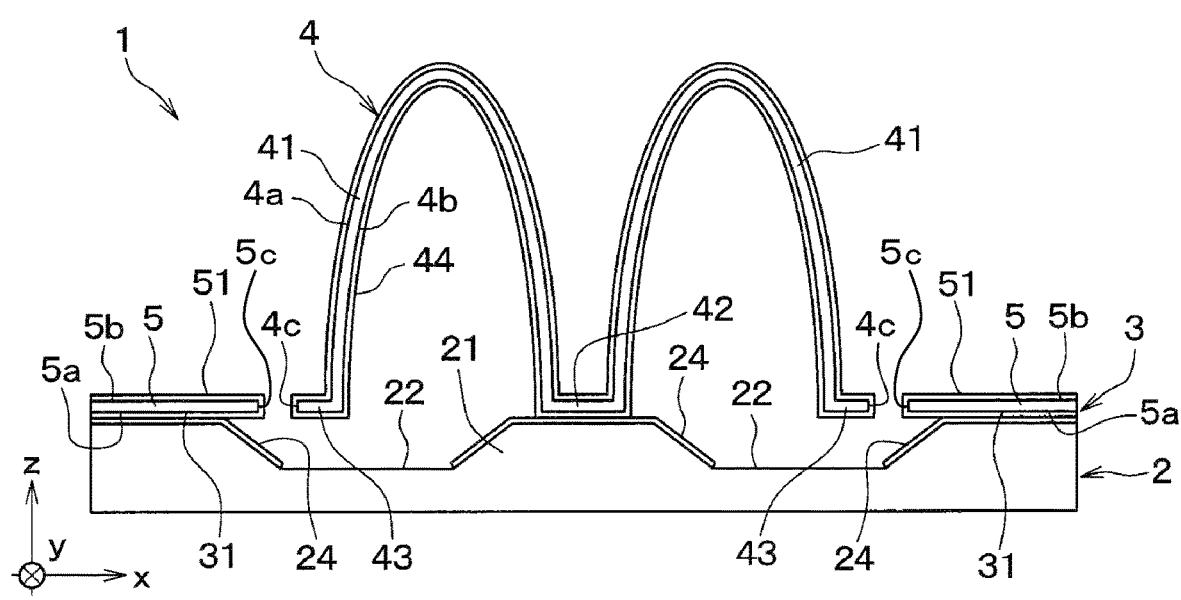
FIG. 4 is a cross-sectional view taken along a line IV-IV in FIG. 2.

As shown in FIGS. 3 and 4, for example, the rim 43 has the same thickness as the electrodes 5 and has the same height as the electrodes 5. That is, the rim 43 is coplanar with a virtual plane formed by the electrodes 5. This is due to the fact that the micro oscillator 4 and the electrodes 5 are formed from a single plate material, and these are separated in the middle of the manufacturing process of the inertial sensor 1. The details will be described later. As shown in FIG. 2, for example, the rim 43 in the top view has a continuous annular shape and is surrounded by the electrodes 5.

The conductive film 44 has, for example, the same structure as the lower metal film 24. A portion of the joint portion 42 that covers the inner surface 4b is metal-bonded to the lower metal film 24. Since the micro oscillator 4 is electrically connected to the lower substrate 2, voltage can be applied to the micro oscillator 4 or the potential of the micro oscillator 4 can be fixed via the wires 23 electrically connected to the pads 7 and the micro oscillator 4.

The electrodes 5 are, in the top view, apart from each other and arranged so as to surround the rim 43 of the micro oscillator 4. As shown in FIG. 4, for example, each electrode 5 has a lower surface 5a facing the lower substrate 2, and the upper metal film 31 is formed on the lower surface 5a. Since the upper metal film 31 and the lower metal film 24 are joined, the electrode 5 is fixed to the lower substrate 2. The electrode 5 partially protrudes from an outer edge of the etching groove 22 toward the support portion 21, and is in an aerial state apart from the lower substrate 2. In other words, the electrode 5 is larger in planar size than a joint surface of the electrode 5 that is joined with the lower substrate 2. The electrode 5 is configured to prevent formation of an unintended metal film in an unintended region of the lower substrate 2 and prevent generation of unintended conduction during film formation of an electrode film 51.

Each electrode 5 includes an upper surface 5b facing away from the lower substrate 2, and an end surface 5c connecting the lower surface 5a and the upper surface 5b. The electrode film 51 is formed on the upper surface 5b and the end surface 5c. A part of the electrode film 51 that covers the end surface 5c of the electrode 5 faces a part of the conductive film 44 that covers the lateral surface 4c of the rim 43. Accordingly, a capacitor is formed. For example, a metal wire (not shown) is connected to the upper surface 5b of the electrode 5 by wire bonding. Thus, a predetermined potential can be applied to the electrode 5 by an external power source (not shown) or an electrostatic capacitance between the electrode 5 and the rim 43 can be detected.

The number, arrangement, size, and shape of the electrodes 5 are not limited to the example shown in FIG. 2, and may be changed as appropriate. Further, since the electrode film 51 is formed in the same process as the conductive film 44, the electrode film 51 has the same configuration as the conductive film 44.

The separation groove 6 is a through groove provided in the upper substrate 3 between the micro oscillator 4 and the electrodes 5, between the micro oscillator 4 and the pads 7, between adjacent ones of the electrodes 5, and between the electrodes 5 and the pads 7. The separation groove 6 is formed by an arbitrary dry etching method such as DRIE (Deep Reactive Ion Etching).

Figure 5:
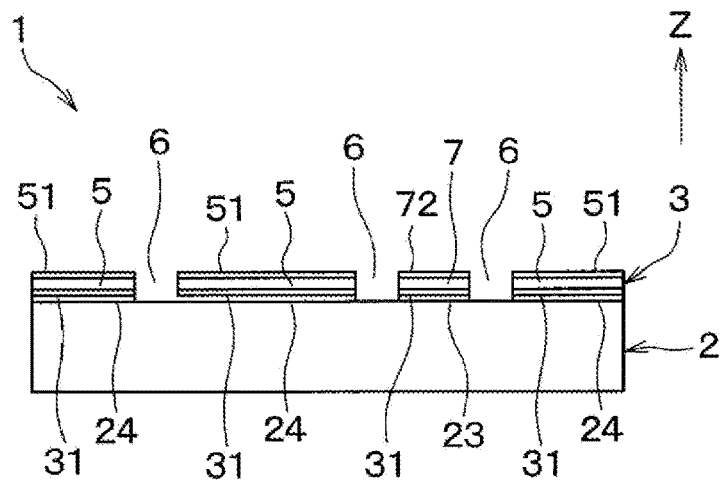
FIG. 5 is a cross-sectional view taken along a line V-V in FIG. 2.

As shown in FIG. 5, for example, in parts of the lower substrate 2 located at the separation groove 6 within the outer peripheral region, the lower metal film 24 is removed at the time of formation of the separation groove 6, and the base material of the lower substrate 2 is exposed through the separation groove 6. In other words, the parts of the lower substrate 2, which are located within the outer peripheral region and exposed from gaps between the electrodes 5 and the pads 7, are in a state where the base material is exposed to the outside. As a result, the electrodes 5 and the pads 7 are electrically independent.

The pads 7 are electrically connected via the wires 23 to the lower metal film 24 covering the support portion 21 and the conductive film 44 of the micro oscillator 4. The pads 7 are used for applying a voltage to the conductive film 44 of the micro oscillator 4 or fixing a potential of the conductive film 44. Similar to the electrodes 5, each pad 7 has a lower surface facing the lower substrate 2, and an upper surface facing away from the lower substrate 2. The upper metal film 31 is formed on the lower surface of the pad 7, and a pad electrode film 72 is formed on the upper surface of the pad 7. Since the upper metal film 31 and the lower metal film 24 are joined, the pad 7 is fixed to the lower substrate 2. The pad 7 has a pad groove 71 which is a through groove, and an inner wall surface of the pad groove 71 is covered with the pad electrode film 72. At a bottom of the pad groove 71 of the pad 7, the pad electrode film 72 is connected to the lower metal film 24 to which a wire 23 is connected. For example, a metal wire (not shown) is connected to the pad 7 by wire bonding. Thus, a potential of the conductive film 44 of the micro oscillator 4 can be controlled by an external power source (not shown).

Since the pad electrode film 72 is formed in the same process as the conductive film 44 and the electrode film 51, the pad electrode film 72 has the same configuration as these films 44 and 51.

The above is a basic configuration of the inertial sensor 1 of the present embodiment.

Next, a method for manufacturing the inertial sensor 1 of the present embodiment will be described with reference to FIGS. 6A to 6J.

Figure 6A:
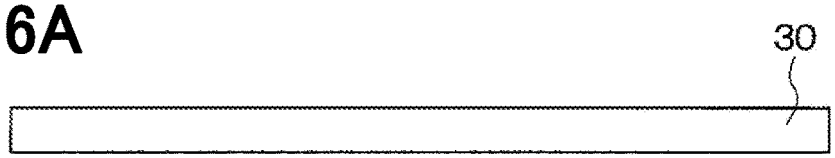
FIG. 6A is a diagram showing a step of preparing an upper substrate in a manufacturing process of the inertial sensor according to the first embodiment.

First, for example, as shown in FIG. 6A, a plate material 30 having a plate shape and made of quartz or the like is prepared. The plate material 30 is a member constituting the upper substrate 3 described later. Here, in order to make the manufacturing process of the inertial sensor 1 easy to understand, a case where one inertial sensor 1 is manufactured by using one plate material 30 and the lower substrate 2 will be described as a typical example, but the present invention is limited to this. It is also possible to manufacture multiple inertial sensors 1 at one time.

Figure 6B:
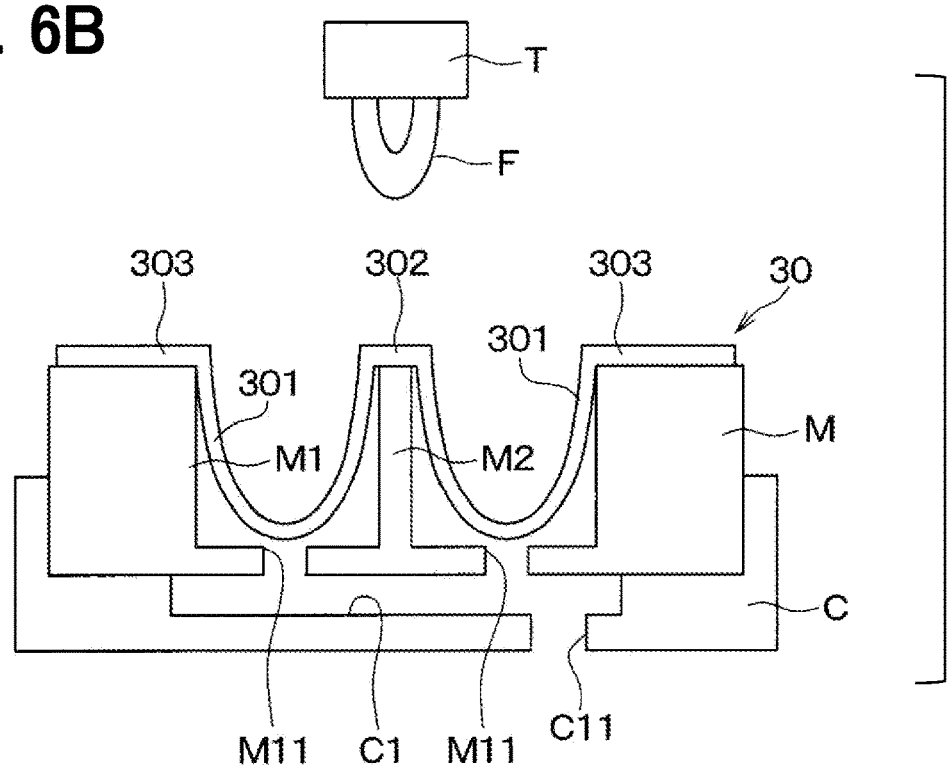
FIG. 6B is a diagram showing a step of the manufacturing process following the step of FIG. 6A.

Subsequently, as shown in FIG. 6B, a mold M for deforming the plate material 30 to have the three-dimensional curved surface, and a cooling block C for cooling the mold M are prepared. The mold M includes, for example, a recess M1 having an annular shape, and a prop M2 extending along a depth direction of the recess M1 at the center of the recess M1. The recess M1 serves as a space for forming the three-dimensional curved surface on the plate material 30. The prop M2 supports a part of the plate material 30 at the time of the processing. The prop M2 has the same height as the outer portion of the recess M1 in the mold M. The mold M has a through hole M11 formed on a bottom of the recess M1. The cooling block C has a fitting portion C1 into which the mold M is fitted, and an exhaust port C11 which is formed on a bottom of the fitting portion C1 and used for exhaust. The cooling block C is configured to cool the mold M at the time of the processing of the plate material 30. The plate material 30 is arranged so as to cover an entire area of the recess M1 of the mold M.

Then, for example, a flame F is blown from a torch T toward the plate material 30 to melt the plate material 30. At this time, the recess M1 of the mold M is evacuated through the exhaust port C11 of the cooling block C by a vacuum mechanism (not shown). Accordingly, a melted portion of the plate material 30 is stretched toward the bottom of the recess M1. In addition, a central region of the melted portion of the plate material 30 is supported by the prop M2. After that, the heating of the plate material 30 is stopped, and the plate material 30 is cooled. As a result, the plate material 30 is deformed to have a curved surface portion 301 having a substantially hemispherical three-dimensional curved shape and a recessed portion 302 that is recessed at or near the center of the curved surface portion 301 and has a shape conforming to the tip surface of the prop M2. Further, a portion of the plate material 30 located outward of the recess M1 is an outer peripheral portion 303. The outer peripheral portion 303 has a flat shape and is located at an outer peripheral edge of the curved surface portion 301.

Figure 6C:
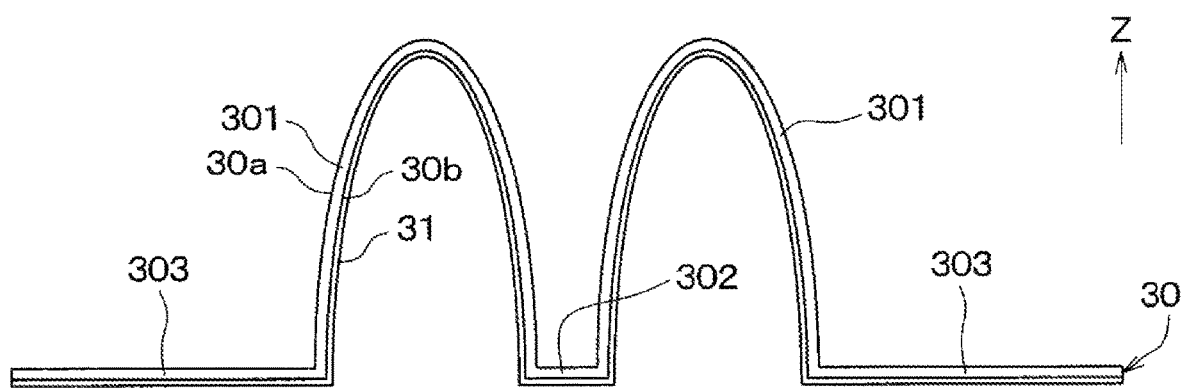
FIG. 6C is a diagram showing a step of the manufacturing process following the step of FIG. 6B.

Subsequently, for example, as shown in FIG. 6C, the plate material 30 is removed from the mold M. A surface of the plate material 30 from which the curved surface portion 301 protrudes is referred to as a protruding surface 30a, and a surface of the plate material 30 opposite to the protruding surface 30a is referred to as an opposite surface 30b. The upper metal film 31 is formed on the opposite surface 30b by, for example, a vacuum film forming process such as sputtering or thin film deposition. The upper metal film 31 is formed on, for example, the entire area of the opposite surface 30*b* of the plate material 30.

Figure 6D:
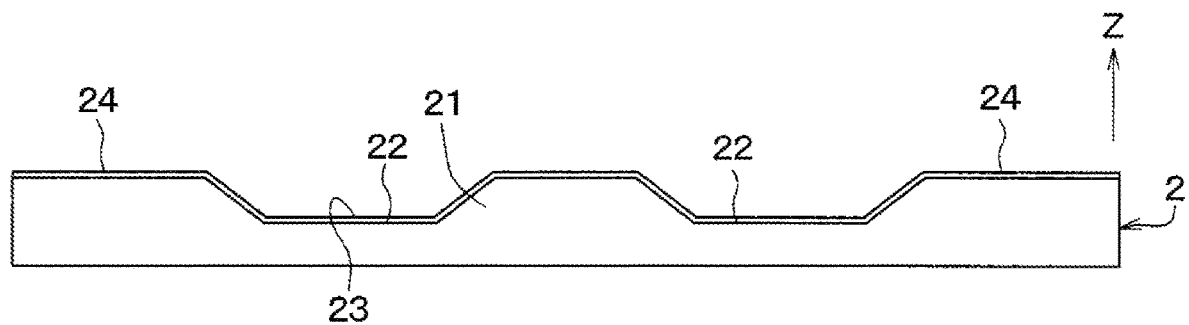
FIG. 6D is a diagram showing a step of the manufacturing process following the step of FIG. 6C.

Then, for example, as shown in FIG. 6D, the lower substrate 2 having the support portion 21, the etching groove 22, the wires 23, and the lower metal film 24 is prepared. The lower substrate 2 is covered with the wires 23 or the lower metal film 24 except for a part of the etching groove 22. The lower substrate 2 is obtained, for example, by the following steps. First, a Si substrate is prepared, and a portion to be the annular etching groove 22 is formed on the Si substrate by wet etching using an alkaline aqueous solution such as KOH or TMAH. After the etching, the wires 23 and the lower metal film 24 having a predetermined pattern shape are formed on the Si substrate by a lift-off method in which a film formation by sputtering is used. According to this step, the Si substrate becomes the lower substrate 2 having the etching groove 22, the wires 23, and the lower metal film 24.

Figure 6E:
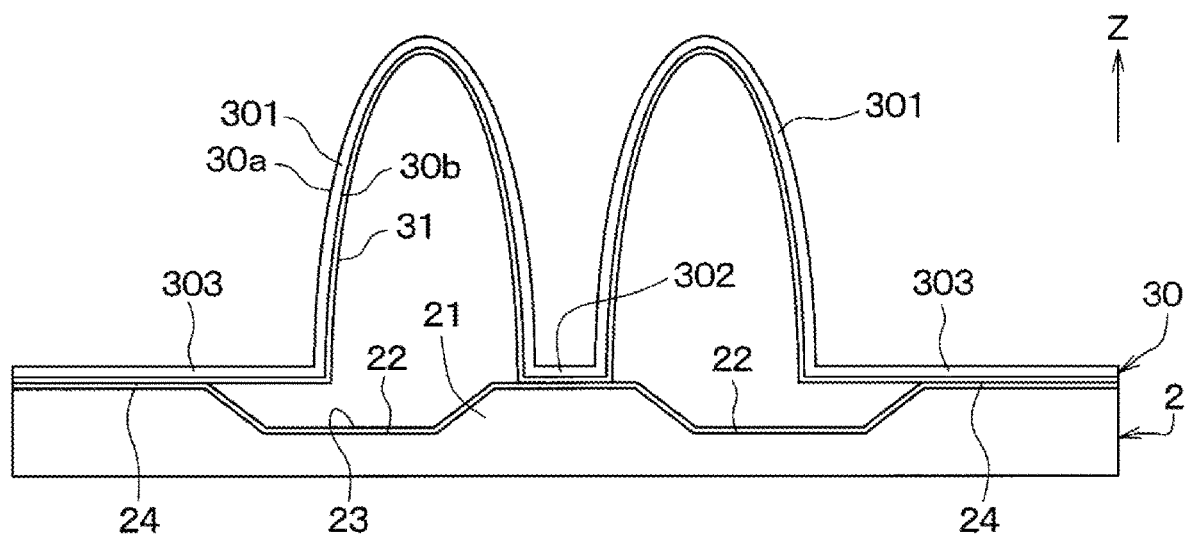
FIG. 6E is a diagram showing a step of the manufacturing process following the step of FIG. 6D.

Subsequently, for example, as shown in FIG. 6E, the recessed portion 302 of the plate material 30 and the support portion 21 of the lower substrate 2 are brought into contact with each other. The outer peripheral portion 303 and the outer peripheral region of the lower substrate 2 are brought into contact with each other. Then, the upper metal film 31 and the lower metal film 24 are bonded by room temperature bonding. For example, the upper metal film 31 and the lower metal film 24 each has a layer structure in which a Ti layer is between an Au layer and a base material, and these Au layers are brought into contact with each other at room temperature to diffuse and rearrange Au atoms, whereby the upper metal film 31 and the lower metal film 24 can be integrated and bonded.

Figure 6F:
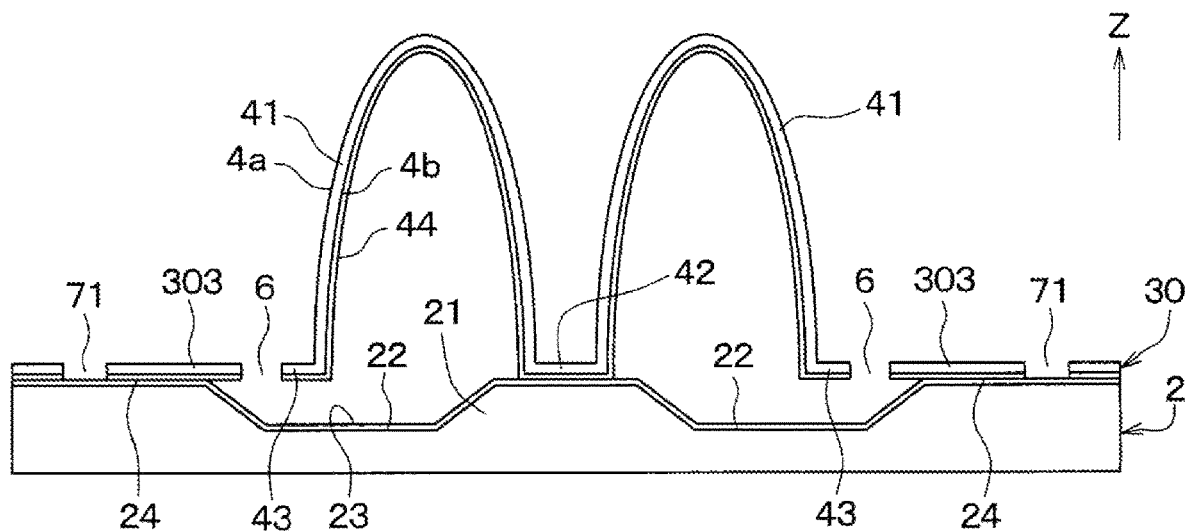
FIG. 6F is a diagram showing a step of the manufacturing process following the step of FIG. 6E.

Next, through grooves extending through the plate material 30 is formed by dry etching such as DRIE in a region of the outer peripheral portion 303 adjacent to the curved surface portion 301 and regions to be separated as the pads 7 later. As a result, for example, as shown in FIG. 6F, the portions of the plate material 30 that were the curved surface portion 301 and the recessed position 302 are separated from the outer peripheral portion 303 by the annular through groove 6, thereby forming the micro oscillator 4. Further, the through grooves formed in the regions to be separated as the pads 7 later becomes the pad grooves 71.

Figure 6G:
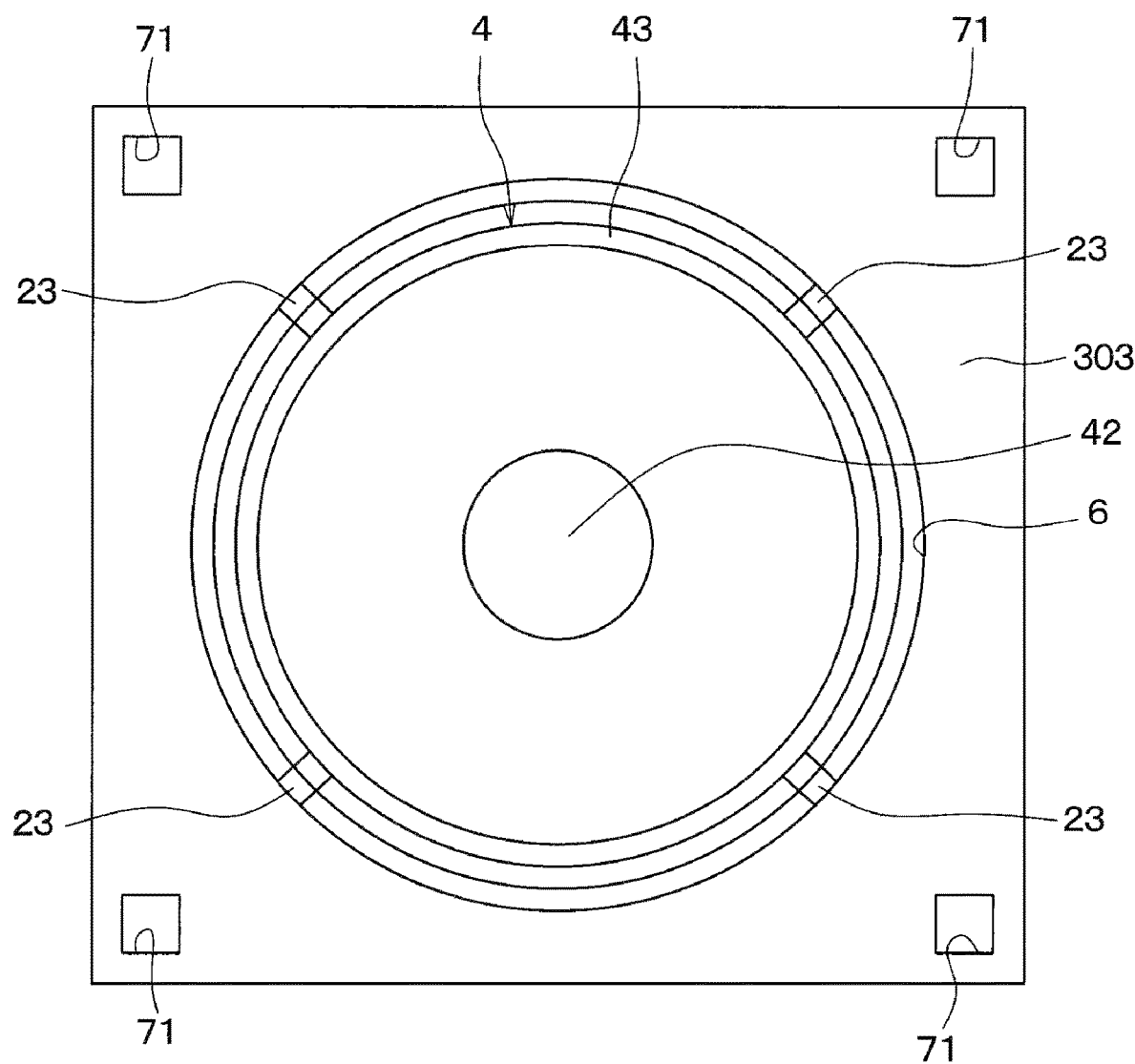
FIG. 6G is a top view showing a state after the step of FIG. 6E.

The above etching is performed to the extent that the lower metal film 24 is not removed in terms of electrical connection between the pads 7 and the wires 23. Immediately after this etching step, the outer peripheral portion 303 of the plate material 30 is still integrated, for example, as shown in FIG. 6G. The electrodes 5 and the pads 7 are not separated.

Figure 6H:
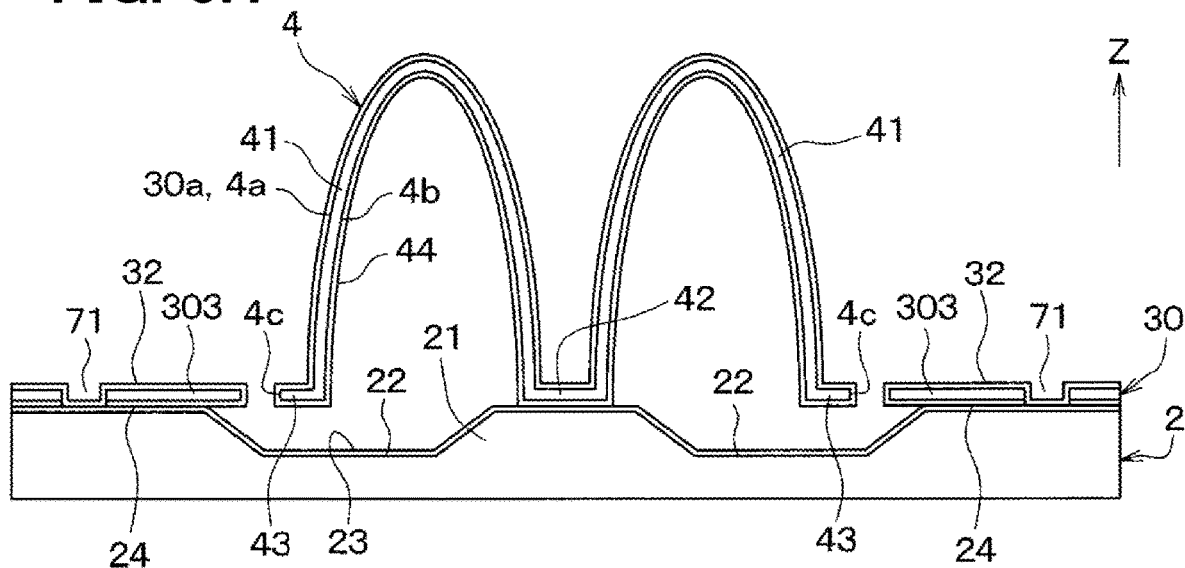
FIG. 6H is a diagram showing a step of the manufacturing process following the step of FIG. 6F.

Then, as shown in FIG. 6H, the conductive film 44 and a metal film 32 are formed on the entire area of the protruding surface 30*a* of the plate material 30 by a vacuum film formation method such as sputtering. The metal film 32 and the conductive film 44 are films that are conductive and have the same configuration. However, in the present specification, for the sake of distinction, the film covering the micro oscillator 4 is referred to as "conductive film 44", and the film covering the outer peripheral portion 303 is referred to as "metal film 32".

Figure 6I:
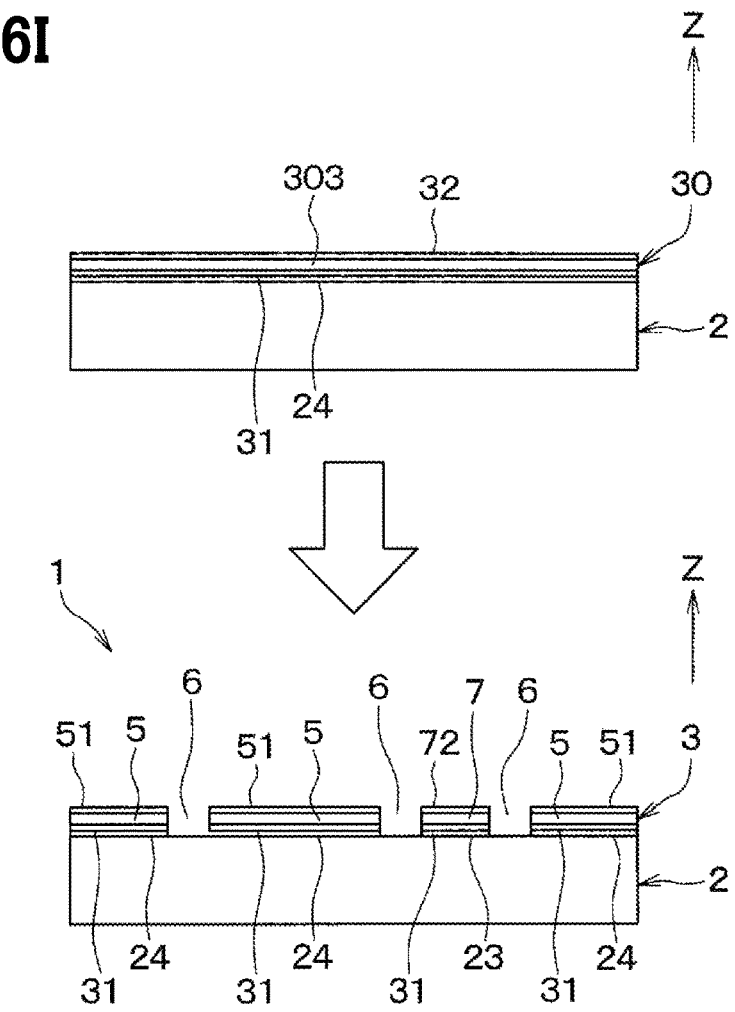
FIG. 6I is a diagram showing a step of the manufacturing process following the step of FIG. 6G.

Then, for example, as shown in FIG. 6I, multiple through grooves, that is, the separation grooves 6, are formed in the outer peripheral portion 303 by dry etching such as DRIE. Accordingly, the outer peripheral portion 303 is separated into the electrodes 5 and the pads 7. In this etching step, the lower metal film 24 is removed such that the base material of the lower substrate 2 is exposed to the outside through the separation grooves 6. As a result, the plate material 30 becomes the upper substrate 3 having the micro oscillator 4, the electrodes 5, and the pads 7. Further, each of the electrodes 5, and each of the pads 7 have structures shown in FIG. 2, for example, and are electrically independent of each other.

Subsequently, for example, the lower substrate 2 is mounted on a circuit board (not shown). Wire bonding is performed to each of the electrodes 5 of the upper substrate 3. The circuit board is electrically connected to the electrodes 5 and the pads 7 of the upper substrate 3. Finally, for example, in a vacuum environment, a cap member (not shown) is attached to the lower substrate 2 or to a member to which the lower substrate 2 is attached. The micro oscillator 4 is sealed air-tightly in an internal space surrounded by the cap member (not shown). By such a process, the inertial sensor 1 according to the present embodiment can be manufactured.

Figure 6J:
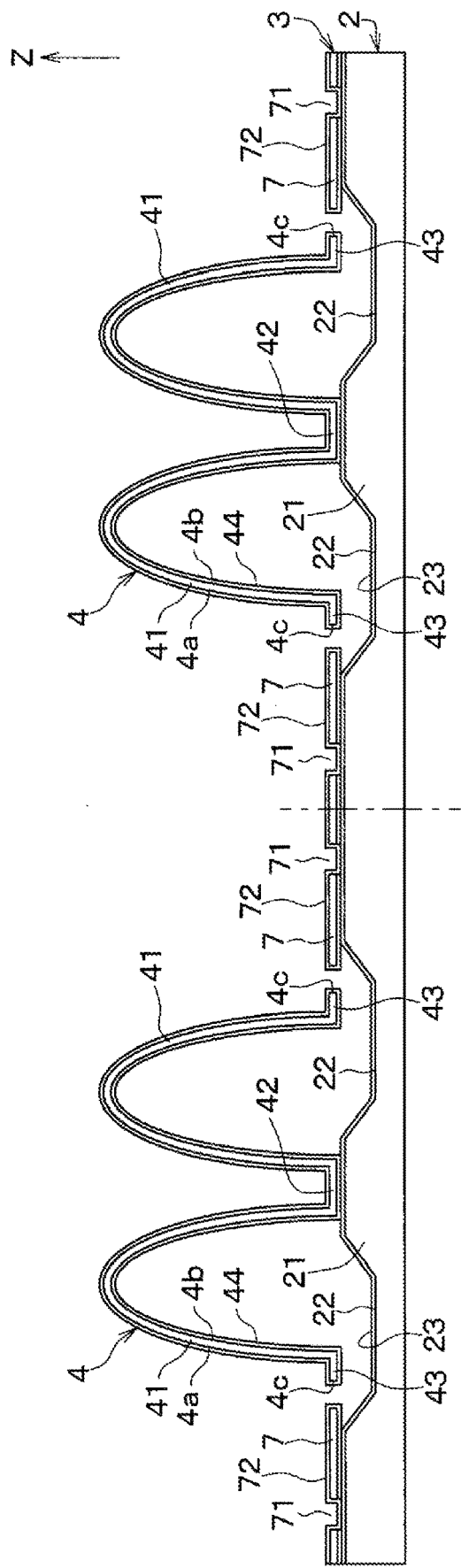
FIG. 6J is a diagram showing a step of the manufacturing process following the step of FIG. 6I in a case of manufacturing multiple inertial sensors at one time.

When multiple inertial sensors 1 are manufactured from one plate material 30 and one lower substrate 2, basically the same process as described above can be performed. In this case, after the step of FIG. 6I, as shown in FIG. 6J, for example, the work is separated into the multiple inertial sensors 1 by an arbitrary method such as laser dicing.

The above is the basic manufacturing method of the inertial sensor 1 of the present embodiment.

In a first comparative example, a micro oscillator 4 and multiple electrodes 5 are made of separate members, and the micro oscillator 4 is mounted on a substrate having the multiple electrodes 5. Thus, in the first comparative example, the distance between the micro oscillator and the multiple electrodes may vary due to the positional deviation when the micro oscillator is mounted. If such a variation in distance occurs, a difference in capacitance will occur between the micro oscillator and the multiple electrodes, and thereby decreasing the sensor accuracy.

In a manufacturing method of a second comparative example, after an oscillator is formed on a flat plate material joined to a lower substrate, the oscillator and electrodes are separated. Therefore, there is no step for mounting the oscillator, and the distance between the oscillator and the electrodes does not vary. However, in this case, in order to form the oscillator, the lower substrate and the plate material are heated at a high temperature of, for example, about 900° C. Therefore, the oscillator cannot be made of a material having a melting point exceeding the heat resistant temperature of the lower substrate (for example, 1700° C. for quartz), and the material of the oscillator is limited. Further, since the high temperature oscillator and the lower substrate are not electrically connected, the potential of the oscillator cannot be fixed and the voltage cannot be applied to the oscillator.

In contrast, according to the manufacturing method of the present embodiment, the micro oscillator 4 and the electrodes 5 are formed of one plate material 30. The plate material 30 is bonded to the lower substrate 2 and then separated. Therefore, there is no variation in distance between the micro oscillator 4 and the electrodes 5. Further, the upper metal film 31 is formed on a surface of the plate material 30 that is to be joined to the lower substrate 2 later. After the lower substrate 2 and the plate material 30 are joined, the plate material 30 is separated into the micro oscillator 4, the electrodes 5, and the pads 7. Therefore, the inertial sensor 1 has a structure in which the micro oscillator 4 and the lower substrate 2 are electrically connected. Therefore, it is possible to fix the potential of the micro oscillator 4 and apply a voltage to the micro oscillator 4.

Further, there is no difference in capacitance due to the variation in distance between the micro oscillator 4 and the electrodes 5, and thereby a high-accuracy physical quantity sensor can be manufactured.

Further, according to this manufacturing method, the rim 43 of the micro oscillator 4 is located on the same plane as the virtual plane formed by the multiple electrodes 5, and the thickness of the rim 43 is the same as that of the electrodes 5. As a result, there is no positional deviation between the rim 43 and the electrodes 5 in the up-down direction, that is, the z direction. Thus, parasitic capacitance due to the positional deviation does not occur. Therefore, the inertial sensor 1 is configured to cancel the electrostatic attraction in the up-down direction on the drive surface (i.e. the lateral surface 4c) of the micro oscillator 4 and simplify the signal processing. Further, it is not necessary to directly hold the micro oscillator 4, and it is possible to prevent damages of the micro oscillator 4 and the conductive film 44 and reduction of Q factor.

The inertial sensor 1 of the present embodiment includes the upper substrate 3 and the lower substrate 2. The upper substrate 3 includes the micro oscillator 4, the electrodes 5, and the pads 7. The lower substrate 2 includes the support portion 21, the etching groove 22, the wires 23, and the lower metal film 24. The upper substrate 3 and the lower substrate 2 are joined to each other, and the micro oscillator 4 is electrically connected to the lower substrate 2. In this inertial sensor 1, the conductive film 44 is formed on the outer surface 4a and the inner surface 4b of the micro oscillator 4. The conductive film 44 is connected to the lower metal film 24 of the lower substrate 2. Therefore, it is possible to fix the potential of the micro oscillator 4 and apply a predetermined voltage to the micro oscillator 4. Further, the micro oscillator 4, the electrodes 5, and the pads 7 are formed by separation of one plate material. Therefore, the rim 43 of the micro oscillator 4 and the electrodes 5 are made of the same material and are located on the same plane. As a result, there is no variation in distance between the micro oscillator 4 and the electrodes 5. Therefore, the inertial sensor 1 can fix the potential of the micro oscillator 4 and apply a voltage to the micro oscillator 4. Further, the difference in capacitance due to the variation in distance between the micro oscillator 4 and the electrodes 5 can be reduced, and thereby the inertial sensor 1 can become a high-accuracy physical quantity sensor.

Second Embodiment

An inertial sensor 1 according to a second embodiment will be described with reference to FIG. 7.

Figure 7:
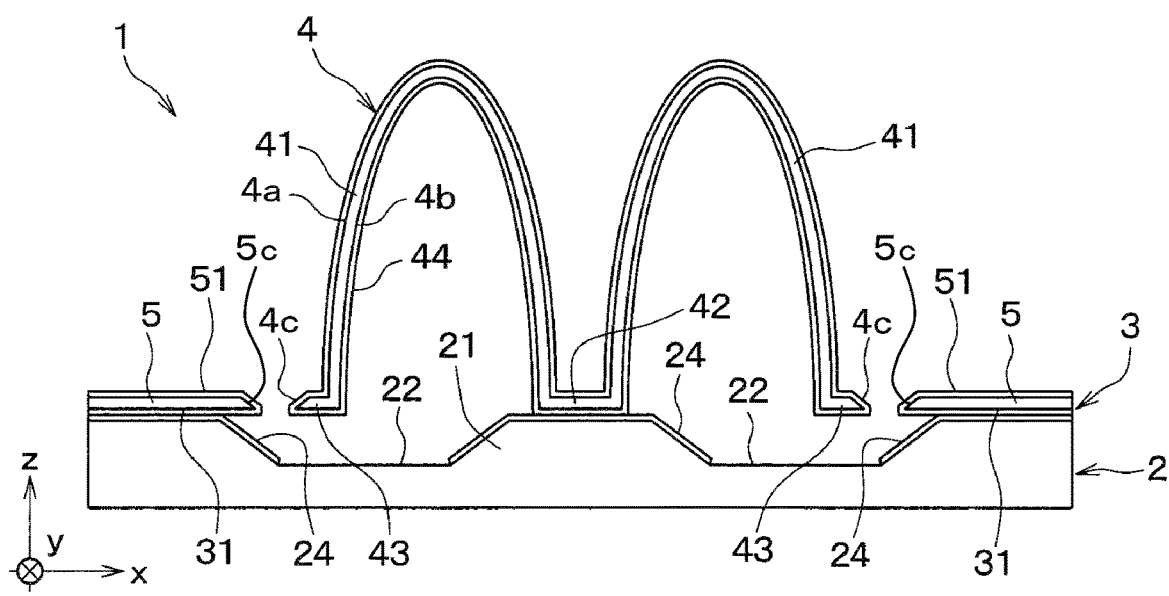
FIG. 7 is a cross-sectional view showing an inertial sensor according to a second embodiment.

As shown in FIG. 7, for example, an inertial sensor 1 of the present embodiment is different from that of the above-described first embodiment in that a lateral surface 4c of a rim 43 and end surfaces 5c of electrodes 5 facing each other is tapered and inclined. This different point will be mainly described in the present embodiment.

In a micro oscillator 4 of the present embodiment, the lateral surface 4c of the rim 43 is an inclined surface and has a tapered shape such that an edge between the lateral surface 4c and an inner surface 4b protrudes toward an electrode 5 more than an edge between the lateral surface 4c and an outer surface 4a. As a result, formation of the conductive film 44 on the lateral surface 4c of the rim 43 becomes easy, and thereby connection between the outer surface 4a and the inner surface 4b of the conductive film 44 becomes easier.

Therefore, an effect of stabilizing the electrical connection to the micro oscillator 4 via the lower substrate 2 can be obtained.

Further, a taper angle is defined as an acute angle among angles between the xy plane and the lateral surface 4c. The taper angle may be less than or equal to a largest inclination angle of the curved surface portion 41 in terms of film formation stability of the conductive film 44. The "inclination angle of the curved surface portion 41" means an acute angle among angles between the xy plane and the outer surface 4a of the curved surface portion 41. Therefore, the conductive film 44 formed on the lateral surface 4c has a film quality similar to that on the outer surface 4a of the micro oscillator 4. As a result, the effect of stabilizing the electrical connection with the inner surface 4b can be obtained.

In the present embodiment, the end surfaces 5c of the electrodes 5 facing the rim 43 have the same tapered shapes as the lateral surface 4c of the rim 43, and the taper angles of the end surfaces 5c are also about the same as the lateral surface 4c. This is because portions of the separation groove 6 that separate the micro oscillator 4, the electrodes 5 and the pads 7 are formed by the same etching process. The taper shape and taper angle can be changed as appropriate by adjusting conditions of dry etching.

According to the present embodiment, the inertial sensor 1 can exert the same effects as those of the first embodiment, and also have the following effects.

The formation of the conductive film 44 on the lateral surface 4c of the rim 43 of the micro oscillator 4 becomes more stable. The connection of the conductive film 44 between the outer surface 4a and the inner surface 4b becomes more stable. Moreover, the electrical connection between the lower substrate 2 and the micro oscillator 4 becomes more stable.

Third Embodiment

An inertial sensor 1 according to a third embodiment will be described with reference to FIG. 8.

Figure 8:
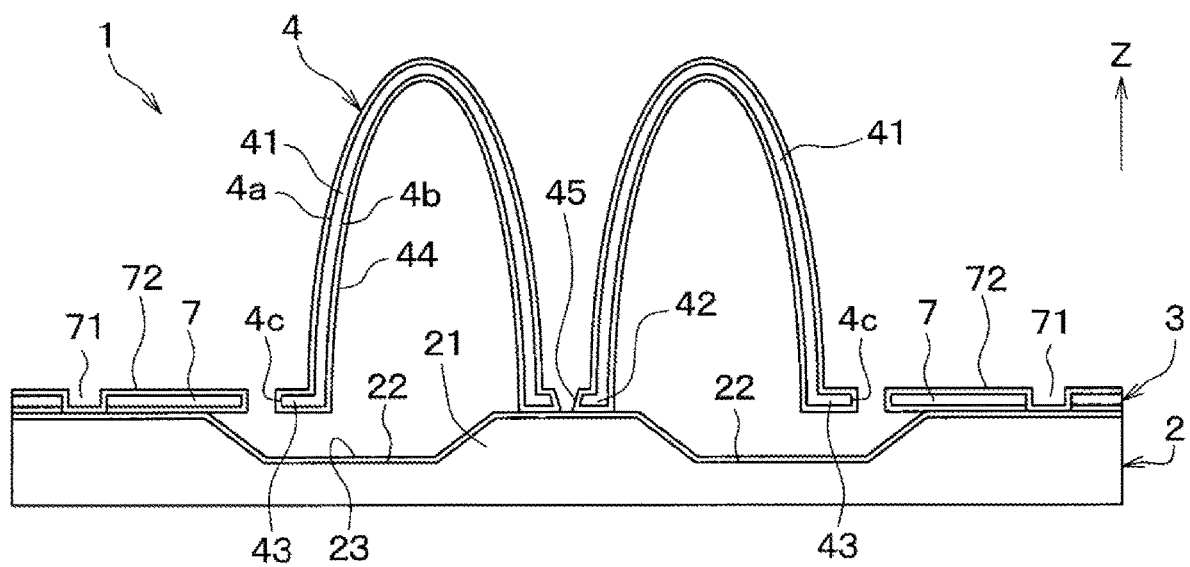
FIG. 8 is a cross-sectional view showing an inertial sensor according to a third embodiment.

As shown in FIG. 8, for example, the inertial sensor 1 of the present embodiment is different from that of the above-described first embodiment in that a through hole 45 connecting an outer surface 4a and an inner surface 4b is formed in a joint portion 42 of the micro oscillator 4. This different point will be mainly described in the present embodiment.

In the present embodiment, the micro oscillator 4 includes the through hole 45 connecting the outer surface 4a and the inner surface 4b at the joint portion 42. An inner wall surface of the through hole 45 is covered with a conductive film 44. The through hole 45 is formed, for example, at the step of forming portions of the separation groove 6 that separate the micro oscillator 4, the electrodes 5 and the pads 7. As shown in FIG. 8, for example, the inner wall surface of the through hole 45 has a tapered shape in a cross-sectional view. The angle between the inner wall surface of the through hole 45 and the xy plane may be less than or equal to a largest inclination angle of a curved surface portion 41 in terms of film formation of the conductive film 44.

According to the present embodiment, the inertial sensor 1 can exert the same effects as those of the first embodiment, and also have the following effects.

In addition to the lateral surface 4c of the rim 43 of the micro oscillator 4, the conductive film 44 is also formed on the inner wall surface of the through hole 45. The connection of the conductive film 44 between the outer surface 4a and the inner surface 4b becomes more stable. Moreover, the electrical connection between the lower substrate 2 and the micro oscillator 4 becomes more stable.

Fourth Embodiment

An inertial sensor 1 according to a fourth embodiment will be described with reference to FIG. 9.

Figure 9:
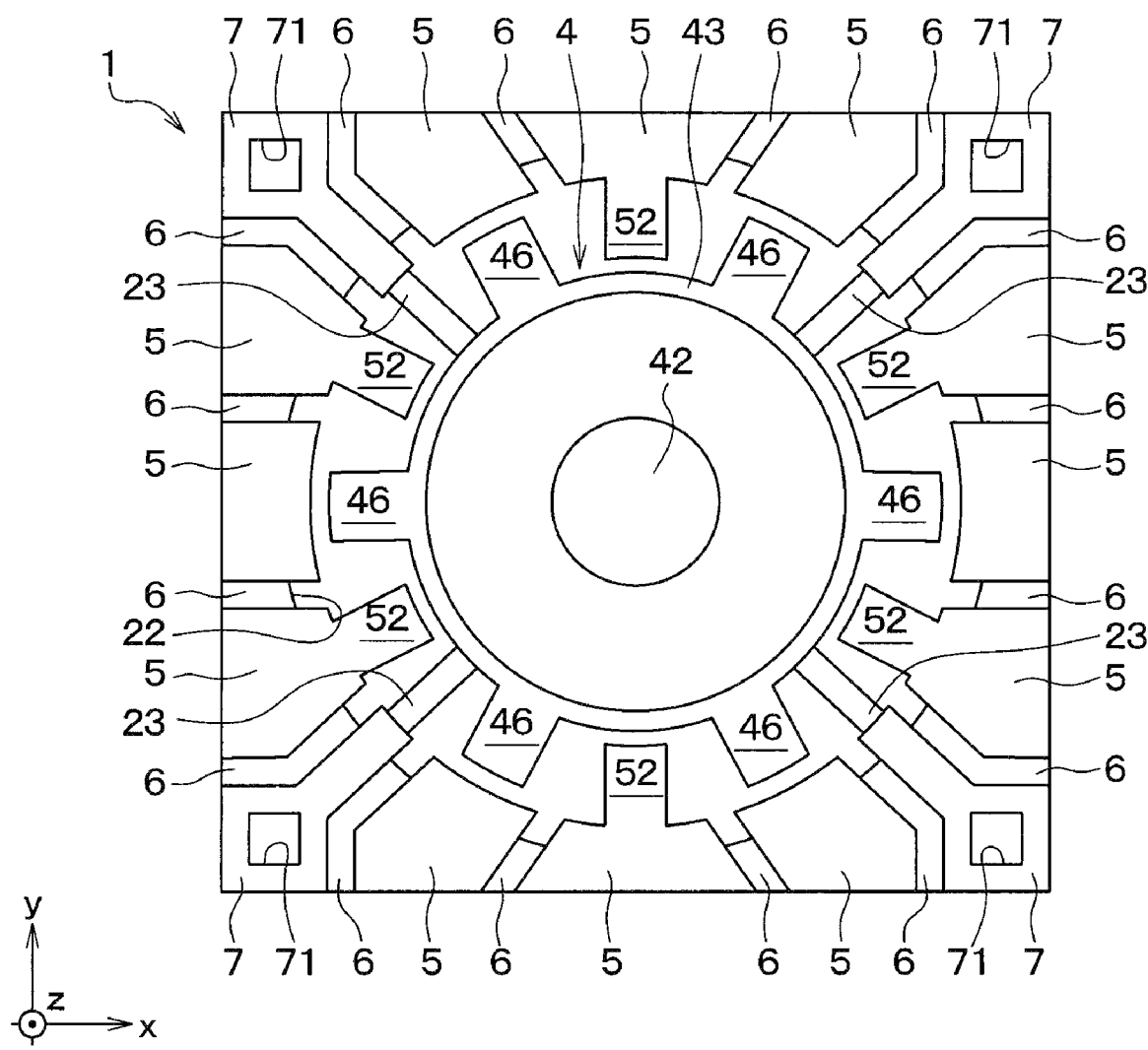
FIG. 9 is a top view showing an inertial sensor according to a fourth embodiment.

As shown in FIG. 9, for example, an inertial sensor 1 of the present embodiment is different from that of the above-described first embodiment in that, in a top view, the inertial sensor 1 has a comb-teeth structure in which a rim 43 of a micro oscillator 4 and electrodes 5 alternately protrude. This different point will be mainly described in the present embodiment.

In the present embodiment, some of the electrodes 5 are protruding electrodes having first protrusions 52 facing and protruding toward the rim 43. The other electrodes 5 are normal electrodes having no first protrusions 52. In the electrodes 5, for example, the normal electrodes and the protruding electrodes are alternately arranged, and the protruding electrodes are not next to each other.

In the micro oscillator 4 of the present embodiment, portions of the rim 43 faces and extends toward the electrodes 5, i.e. the rim 43 have second protrusions 46 protruding toward the electrodes 5. The second protrusions 46 are formed in portions of the rim 43 that faces the normal electrodes. As a result, the micro oscillator 4 and the electrodes 5 have the comb-tooth structure in which the first protrusions 52 and the second protrusions 46 are alternately arranged in the top view.

According to the present embodiment, the inertial sensor 1 can exert the same effects as those of the first embodiment, and also have the following effects.

Since the micro oscillator 4 and the electrodes 5 have the comb-tooth structure, a capacitance between the micro oscillator 4 and the electrodes 5 increases as compared with the above embodiments. The inertial sensor 1 becomes more accurate.

Other Embodiments

Although the present disclosure has been described in accordance with the embodiments, it is understood that the present disclosure is not limited to such embodiments or structures. The present disclosure also includes various modifications and changes within the range of equivalency. In addition, as the various combinations and configurations, which are preferred, other combinations and configurations, including more, less or only a single element, are also within the spirit and scope of the present disclosure.

For example, the inertial sensor 1 may have a structure in which the micro oscillator 4 has the through hole 45 and at the same time, the lateral surface 4c of the rim 43 has the tapered shape. The inertial sensor 1 may have the comb-tooth structure of the rim 43 and the electrodes 5 while having the through hole 45. Therefore, the inertial sensor 1 may be configured by combining the above embodiments within a possible range as appropriate.

What is claimed is:

1. An inertial sensor comprising:
a lower substrate including a support portion, an etching groove surrounding the support portion, a wire extending across the etching groove, and a lower metal film covering the support portion; and
an upper substrate including a micro oscillator, electrodes, and a pad, which are independent of each other, wherein
the micro oscillator includes:
a curved surface portion having a three-dimensional curved surface;
a joint portion recessed inward from an apex of the curved surface portion and joined to the support portion of the lower substrate;
a rim formed at an end of the curved surface portion opposite to the joint portion; and
a conductive film covering an outer surface and an inner surface of the micro oscillator,
the curved surface portion is in an aerial state in which the curved surface portion is not in contact with other members,
the rim is made of the same material as the electrodes,
the rim is coplanar with a virtual flat plane formed by the electrodes,
the rim is apart from and surrounded by the electrodes, and
a portion of the conductive film that covers the joint portion is electrically bonded to the lower metal film.

2. The inertial sensor according to claim 1, wherein
the electrodes are separated by a separation groove and are electrically independent of each other.

3. The inertial sensor according to claim 1, wherein
the pad includes a pad groove which is a through groove, and the pad is electrically connected to the lower metal film at a bottom of the pad groove via the wire.

4. The inertial sensor according to claim 1, wherein
a lateral surface of the rim connecting the outer surface and the inner surface has a tapered shape in which an edge of the rim between the lateral surface and the inner surface protrudes toward the electrodes more than an edge of the rim between the lateral surface and the outer surface.

5. The inertial sensor according to claim 1, wherein
the micro oscillator has a through hole at the joint portion,
an inner wall surface of the through hole is covered with the conductive film, and
the lower metal film is electrically connected to the conductive film covering the inner wall surface of the through hole.

6. The inertial sensor according to claim 1, wherein
the upper substrate is made of quartz.

7. The inertial sensor according to claim 1, wherein
ones of the electrodes are protruding electrodes having first protrusions protruding toward the rim,
portions of the rim that face ones of the electrodes other than the protruding electrodes have second protrusions protruding toward the ones of the electrodes other than the protruding electrodes, and
the micro oscillator and the electrodes have a comb-tooth structure in which the first protrusions and the second protrusions are alternately arranged.

8. A method for manufacturing an inertial sensor, comprising:
preparing a lower substrate including a support portion, an etching groove surrounding the support portion, a wire extending across the etching groove, and a lower metal film covering the support portion;
preparing a plate material having a plate shape;
forming a curved surface portion having an annular shape in the plate material;
after the forming of the curved surface portion, forming an upper metal film on a surface of the plate material that is opposite to a protruding surface of the plate material on which the curved surface portion protrudes;

bonding the upper metal film and the lower metal film to integrate the plate material and the lower substrate;

forming a through groove having an annular shape surrounding the curved surface portion on the plate material bonded to the lower substrate such that the curved surface portion is separated by the through groove from another portion of the plate material;

after the forming of the through groove, forming a conductive film on the protruding surface of the plate material; and after the forming of the conductive film, forming a through groove in an outer peripheral portion located radially outward of the curved surface portion of the plate material such that electrodes and a pad electrically independent of each other are formed.

* * * * *